Oct. 20, 1931.  A. G. M. MICHELL  1,828,289
BRUSH FOR RECIPROCATING MEMBERS
Filed Feb. 8, 1928
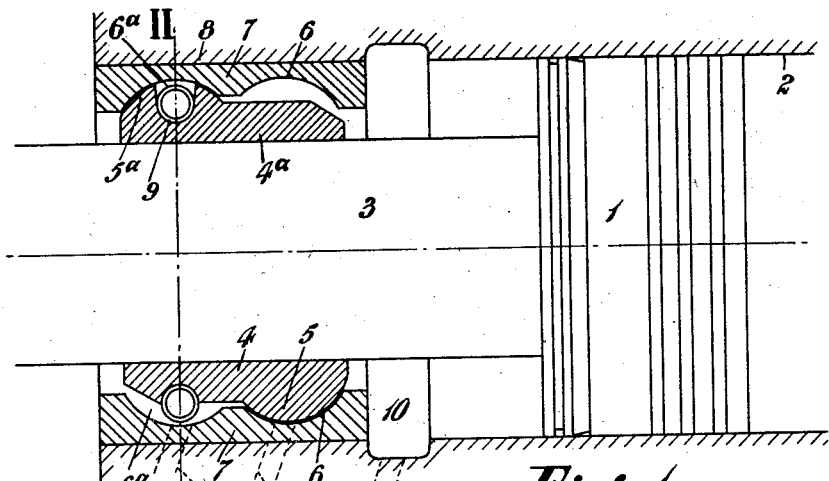
Fig.1.
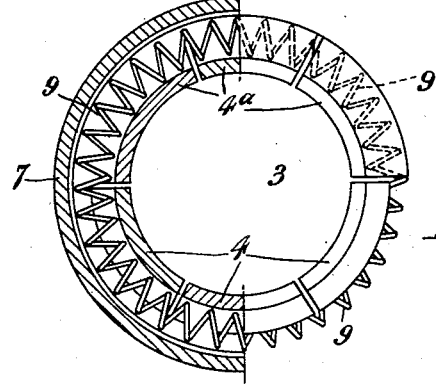
Fig.2.
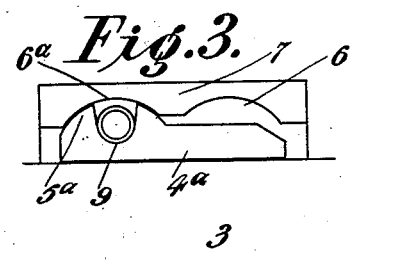
Fig.3.
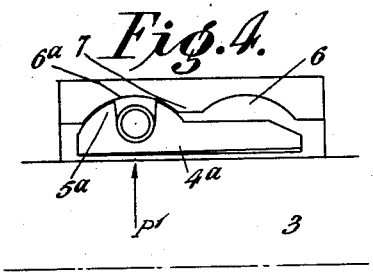
Fig.4.
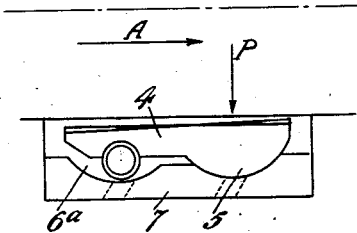
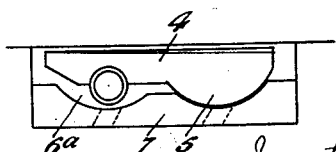
Inventor.
Anthony G. M. Michell,
By Henry Orth Jr
Atty Patented Oct. 20, 1931

1,828,289

UNITED STATES PATENT OFFICE

ANTHONY GEORGE MALDON MICHELL, OF MELBOURNE, VICTORIA, AUSTRALIA, ASSIGNOR, BY MESNE ASSIGNMENTS, TO MICHELL-CRANKLESS ENGINES CORPORATION, OF NEW YORK, N. Y., A CORPORATION OF NEW YORK

BUSH FOR RECIPROCATING MEMBERS

Application filed February 8, 1928, Serial No. 252,890, and in Great Britain February 22, 1927.

This invention relates to improvements in the hollow cylindrical members, known as bushes, commonly employed in numerous classes of machines and especially in reciprocating engines, as guide members for reciprocating cylindrical rods fitting within them. It is usual to construct such bushes in one piece, but they are sometimes, for reasons of easy assembly or otherwise, formed in two or more segments of a more or less complete cylinder. Bushes constructed according to the present invention are of the latter class.

The object of the invention is to provide the conditions necessary for effective lubrication of such bush members, while at the same time providing means for preventing excessive flow of oil past the bush, and thus to enable bush members of comparatively simple type to be used in cases where it has been customary to use stuffing-boxes or special scraping devices, as for example upon the piston-rods of high-speed steam-engines and air compressors to prevent transfer of oil from their crank-chambers to their cylinders.

The invention is particularly applicable to engines of the crankless type, but is not restricted thereto.

Briefly stated the essential feature of the invention consists of a bush formed of two or more segments collectively acting as a guide for a reciprocating rod, said segments being variously pivoted and adapted to set up separate tilting movements about axes transverse to the axis of said rod, so that the tilting varies over the several segments to permit through flow of lubricant in reverse directions longitudinally through the bush, with which may be combined elastic means arranged towards one or other end of each of the segments urging the same into contact with the reciprocating rod.

In the accompanying drawings, Fig. 1 is a longitudinal view of a piston and rod, the bush being shown in a longitudinal section. Fig. 2 is in part an end view of the bush, and in part a cross-section on line II, II of Fig. 1. Figs. 3 and 4 are partial longitudinal views corresponding to Fig. 1 and illustrating the action of the parts of the bush.

As shown in Fig. 1, the single-acting piston 1 reciprocates in the cylinder 2, and is fitted with the cylindrical rod 3, which in the case of an engine of the connecting-rod and crank type is the piston-rod, and in an engine of crankless-type (see: e. g. United States Reissue Patent No. 15,756, granted February 5, 1924) is a stem connecting the piston with the yoke-member carrying the slippers which co-act with the swash-plate or slant. In either type of engine however, if of the single-acting class, the rod 3 may be of the full diameter of the piston, thus forming a trunk rod, or extension of the piston itself.

The bush illustrated which is constructed in accordance with this invention consists of two or more segments 4, 4a (six being shown in Fig. 2), which together form a nearly complete cylindrical ring of which the inner surface fits the rod 3. Each segment is pivotally supported with respect to the stationary part of the machine by a spherical projection 5 or 5a thereon fitting in one or other of two recesses 6, 6a. These recesses are preferably formed in a sleeve-member 7 fixed in an extension 8 of the wall of the cylinder 2. Surrounding the outer ends of the segments 4, 4a (that is to say, the ends remote from the piston 1), is a garter spring 9 which tends to draw all the segments 4, 4a together and into contact with the rod 3. The tension of the spring 9 is however adjusted so as to exert lighter radially inward forces on the segments than the principal lateral or radially outward pressures which the latter receive from the rod 3; the direction of the radial forces may change periodically in various ways according to the type of engine or other machine.

Each segment 4 or 4a has its pivotal projection 5 or 5a, located either in the inner recess 6 or outer recess 6a according as pressure is or is not exerted on that segment by the rod 3 during its inward stroke. Thus, as shown in Fig. 3, the lower segment 4 is assumed to be subjected to a load P (due to the weight of the piston 2 and rod 3 or to the thrust of a connecting-rod or the like), while the rod 3 is moving inwardly to the right as shown by the arrow A; the lower segment 4 is therefore mounted with its pivotal projection 5 in the inner recess 6.

Under these conditions, the segment 4 being subjected to the load P which concentrates on its trailing end because of the yielding support provided at its inner end, tilts as shown in an exaggerated manner in Fig. 3 so as to form a wedge-shaped film of oil between its interior surface and the rod 3, and a flow of oil takes place through this film in the inward direction of the arrow A.

The upper segment 4a, being subjected only to the yielding pressure of the spring 9 at its leading end, remains in close contact with the rod 3, and permits little or no inward flow of oil.

In the return stroke of the rod 3, as shown by Fig. 4, the segment 4a being assumed to be now subjected to the force $P^1$ from the rod 3 and this force $P^1$, which again concentrates at the trailing end, being greater than the inward pressure of the spring 9, the segment 4a now tends to tilt as shown in the figure so as to form a wedge-shaped film of oil between its interior surface and the rod 3, and to permit a flow of oil from its inner to its outer end in the direction of the arrow $A^1$. At the same time, the lower segment 4, being now subjected only to the yielding upward pressure of the spring 9 at its trailing end, likewise tilts as shown and allows a flow of oil from its inner to its outer end in the direction of the arrow $A^1$. Thus accumulation of oil at the inner end of the bush, and a transference of oil into the cylinder 2 are prevented, while the segments of the bush subjected to pressure by the rod 3, are effectively lubricated. As an auxiliary means of preventing accumulation of oil while the engine is stationary, or working under abnormal conditions, a recess or chamber 10, may be formed in the cylinder wall at the inner end of the bush, this chamber and the recesses 6, 6a, being drained by oil-ways 11, 12 and 12a respectively.

It is to be understood that the form of the projections 5, 5a, and recesses 6, 6a hereinbefore described and shown in the figures, are subject to modification according to circumstance, their essential features being that they permit of the pivoting of the segments 4, 4a, at their inner and outer ends respectively.

It is likewise to be understood that the spring 9 is described and illustrated as a garter-spring only by way of example, and that any other form of spring or springs suitable for maintaining inward pressure of the segments of the bush towards one of their ends may be substituted.

I claim:—

1. A bush for a reciprocating rod, comprising a plurality of segments pivoted adjacent the ends thereof and having bearing surfaces adapted to engage the rod.

2. A bush for a reciprocating rod, comprising a plurality of segments having bearing surfaces adapted to engage the rod, said segments being pivoted on axes offset from the longitudinal centers of the segments and transverse to the axis of reciprocation of said rod.

3. A bush for a reciprocating rod, comprising a plurality of pivoted segments having bearing surfaces adapted to engage the rod, and resilient means for pressing the segments against said rod.

4. A bush for a reciprocating rod, comprising a plurality of pivoted segments having bearing surfaces adapted to engage the rod, certain of said segments being pivoted adjacent one end of the bush, and others being pivoted adjacent the other end of the bush.

5. A bush for a reciprocating rod, comprising a plurality of pivoted segments having bearing surfaces adapted to engage the rod, and resilient means for pressing the segments against said rod, said resilient means engaging certain of said segments adjacent the pivoted portions thereof and engaging other segments adjacent portions remote from the pivoted portions thereof.

6. A bush for a reciprocating rod, comprising a plurality of pivoted segments having bearing surfaces adapted to engage the rod and resilient means for exerting an inward pressure in said segments, said resilient means acting on certain of said segments remote from the pivots thereof.

7. A bush for a reciprocating rod, comprising a plurality of pivoted segments having bearing surfaces adapted to engage the rod and resilient means for exerting an inward pressure in said segments, said resilient means acting on certain of said segments remote from the pivots thereof, and on other segments adjacent the pivots thereof.

8. A bush forming a lubricated guide for a reciprocating rod, comprising a plurality of segments pivoted on axes transverse to the axis of said rod.

9. A bush forming a lubricated guide for a reciprocating rod, comprising a plurality of segments pivoted on axes transverse to the axis of said rod, certain of said segments being tiltable on pivots adjacent one end of the bush and others of the segments being tiltable on axes adjacent the other end of the bush.

10. A bush forming a lubricated guide for a reciprocating rod and consisting of unsymmetrically pivoted segments forming an annular series surrounding the rod, substantially as and for the purposes set forth.

11. A bush for a reciprocating rod, comprising a plurality of segments, a pivotal mounting for said segments, said segments being pivoted on axes transverse to the axis of the bush to hold the segments against longitudinal movement with the rod as the rod is reciprocated.

12. A bush for a reciprocating rod, comprising a housing, a plurality of segments disposed within said housing, said segments being mounted for pivotal movement in said housing on axes transverse to the axis of the housing.

In witness whereof I have signed this specification.

ANTHONY GEORGE MALDON MICHELL.